UNITED STATES PATENT OFFICE 2,676,163

METHOD OF PREPARING SILOXANE POLYMERS UTILIZING SILAZANES

John L. Speier, Pittsburgh, Pa., assignor to Dow Corning Corporation, Midland, Mich., a corporation of Michigan No Drawing. Application September 3, 1952,
Serial No. 307,704

2 Claims. (Cl. 260—46.5)

This invention relates to a method of preparing polymers by reacting a silazane with a hydroxylated organosilicon compound and to the copolymers so prepared.

Previously siloxanes have been polymerized by hydroxyl condensation and by siloxane bond rearrangement. In both cases elevated temperatures and catalysts are required if the process is to be carried out at a feasible rate. In such cases the catalyst remains in the finished polymer. This may cause undesirable reactions later due to degradation of the polymer at elevated temperatures. It would be highly desirable therefore to polymerize siloxanes by a method which leaves no residual catalyst. Attempts to do this by the condensation of silicon bonded hydroxyls by heat alone does not produce satisfactory products.

The applicant has solved this difficulty by a novel method of reacting hydroxylated organosilicon compounds with organosilazanes. The reaction proceeds smoothly even at room temperature with the elimination of ammonia or methyl amine. The resulting products are free of undesirable catalysts and have unique properties. The resinous polymers prepared by this method are particularly characterized by a combination of hardness and toughness which is not exhibited by organosiloxanes polymerized by conventional methods. This invention is particularly adapted for use in the preparation of potting compounds for electrical apparatus.

In accordance with this invention, an organosilicon compound containing at least .6 per cent by weight silicon bonded hydroxyl groups and from .9 to 3 hydrocarbon radicals per silicon atom, the remaining valences of the silicon, if any, being satisfied by oxygen atoms, is reacted with an organosilazane of the formula

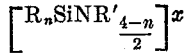

The silazane is employed in amount of at least .1 per cent by weight of the hydroxylated organosilicon compound.

The hydroxylated organosilicon compounds which are employed in this invention include both monomeric materials and polymeric materials. Any organosilicon compound containing the required amount of hydroxyl groups in which the organic radicals attached to the silicon are monovalent hydrocarbon radicals free of $C\equiv C$ linkages is operative in this invention. Thus the hydroxylated organosilicon compounds include monomeric silanols such as $R_3SiOH$ and $R_2Si(OH)_2$, polymers of the formula $$HO(R_2SiO)_xH$$

and hydroxylated resins containing $SiO_2$, $RSiO_{1.5}$, $R_2SiO$ and $R_3SiO_{.5}$ units in such proportions that there are at least .9 R groups per Si atom. R represents the above defined hydrocarbon radicals. Specific examples of radicals which are operative are methyl, propyl, octadecyl, vinyl, allyl, hexadienyl, cyclohexyl, cyclohexenyl, phenyl, tolyl, xenyl and benzyl. Any combination of these radicals may be present in the siloxane.

The silazanes which are operative in this invention are of the formula

where R is a monovalent hydrocarbon radical free of $C\equiv C$ linkages, $n$ has a value from 1.99 to 2, R' is hydrogen or methyl and $x$ is an integer of at least 3. These silazanes are polymeric materials having at least 3 polymer units per molecule. These materials may be best prepared by reacting the corresponding chlorosilanes with liquid ammonia or with liquid methyl amine in the manner described in the applicant's copending application filed concurrently herewith. For the purpose of this invention, the R groups on the silazane may be, for example, methyl, ethyl, octadecyl, phenyl, tolyl, xenyl, benzyl, allyl, vinyl, hexadienyl, cyclohexenyl and cyclohexyl or any combination thereof. The silazanes are composed essentially of units of the formula $R_2SiNR'$ but may also contain small amounts of units of the structure

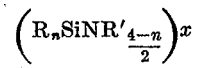

The process of this invention proceeds spontaneously upon mixing the above hydroxylated compounds with the silazanes. The schematic equation is:

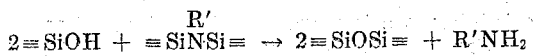

Reaction proceeds even below room temperature and may be carried out at temperatures ranging up to 400° C. However, in view of the rapidity of the reaction and the superior products obtained there is little advantage in operating at temperatures above 150° C. In order to realize the benefits of this invention, the silazane should be employed in amount of at least .1 per cent by weight based on the hydroxylated organosilicon compound. Any amount of silazane above the minimum may be employed if desired. In those cases in which the amount of silazane is such that there is more than one SiNSi group per two OH groups, some of the silicon atoms in the resulting polymer will be connected by SiOSi linkages and the remaining silicon atoms will be connected through SiNSi linkages. These copolymers of siloxanes and silazanes exhibit some unique properties. They are rubbery in character resembling the gels obtained by cross-linking siloxanes and yet the silazane copolymers are soluble. These copolymers exhibit a rust inhibiting effect when applied to steel. When the SiNSi linkages are exposed to moisture they hydrolyze with the evolution of ammonia. The resulting product is a siloxane.

The siloxane-silazane copolymers within the scope of this invention are composed of from 25 to 99.99 mol per cent siloxane units of the formula $$R_m SiO_{\frac{4-m}{2}}$$

and from .01 to 75 mol per cent silazane units of the formula $$R_n Si(NR')_{\frac{4-n}{2}}$$

where R and R' are as above defined, $m$ has an average value from .9 to 2.5 and $n$ has an average value from 1.99 to 2.

The arrangement of the various units will vary with the starting materials. Thus if a diorganosilanol is reacted with a diorganosilazane, the resulting polymer will have a linear structure such as for example $$-\underset{R_2}{\overset{}{Si}}O\underset{R_2}{\overset{}{Si}}O\underset{R_2}{\overset{}{Si}}N\underset{R'}{\overset{R'}{Si}}N\underset{R_2}{\overset{}{Si}}O\underset{R_2}{\overset{}{Si}}-$$

The precise manner of distribution of siloxane and silazane units along the chain is not known.

Those polymers containing unsubstituted-, monoorgano- and triorgano- siloxane units may have structures as indicated below.

[structural formula]

The method of this invention is particularly adaptable to the preparation of superior coating compositions. This is illustrated by the fact that a direct comparison between a siloxane resin which is set by conventional zinc naphthanate dryers requires higher temperatures than the same composition which is polymerized by reaction with a silazane. Furthermore, the finished coating prepared by the present novel method exhibits more toughness and hardness than the coating prepared by conventional methods. In addition the process of this invention readily adapts itself for the potting of electrical equipment. When suitable siloxane compositions are mixed with the silazanes and poured into a space around electrical equipment, the siloxane will then polymerize to a gel in a short length of time at low temperatures and the by-produced ammonia escapes without bubble formation. Thus there is no residue catalyst to further alter the properties of the product. Such potting compositions retain their resilience and dielectric strength from very low to very high temperatures.

The following examples are illustrative of this invention but are not to be construed as limiting the scope thereof. The latter is properly delineated in the appended claims.

Example 1

60 g. of a siloxane resin having the composition 33⅓ mol per cent dimethylsiloxane, 33⅓ mol per cent monomethylsiloxane, and 33⅓ mol per cent monophenylsiloxane and containing about 3.5 per cent by weight silicon bonded OH groups, was dissolved in toluene to give a 60 per cent solution. 10 g. of hexamethylcyclotrisilazane was added to the solution and films thereof were cast on a glass plate. The composition gelled in 2 hours at room temperature and was then heated 2 hours at 110° C. The resulting films were stripped from the glass and were found to have superior physical strength to the other silicone films which had necessarily been prepared at much higher temperatures.

Example 2

A mixture of 2.5 g. of a hydroxylated copolymer composed of 70 mol per cent dimethylsiloxane and 30 mol per cent monophenylsiloxane was mixed with 2.5 g. of a hydroxyl end-blocked phenylmethylsiloxane fluid. The resulting mixture contained 5 per cent silicon bonded hydroxyl groups. .6 g. of hexamethylcyclotrisilazane was added to the mixture and the resulting material was poured around an electrical resistor in a small beaker. The mixture was heated overnight at 70° C. whereupon it had set to a resilient material. The system was alternately heated to 125° C. and cooled to —50° C. without any deleterious effects on the dielectric properties of the siloxane.

Example 3

10 g. of tetramethyldisiloxanediol was mixed with 10 g. of hexamethylcyclotrisilazane and heated to 67–70° C. for 72 hours. The resulting product was a copolymer containing both SiOSi and SiNSi linkages. This material was a rubbery polymer.

Example 4

8.5 g. of diphenylsilanediol was mixed with 8.5 g. of triphenyltrimethylcyclotrisilazane and heated up to 190° C. within 1 hour. A polymeric material resulted which was soluble in toluene and which contained both siloxane and silazane linkages.

Example 5

140 g. of a hydroxylated dimethylsiloxane fluid containing 3.22 per cent silicon bonded hydroxyl groups was mixed with 13.5 g. of hexamethylcyclotrisilazane and heated 6 hours at 150–155° C. A rubbery polymer was obtained which was found by analysis to contain .44 per cent nitrogen in the form of $$\overset{H}{Si-N-Si}$$

linkages.

Example 6

291 g. of a dimethylsiloxane fluid containing 3.2 per cent silicon bonded OH groups was mixed with 51 g. of a mixture of hexamethylcyclotrisilazane and a trace of a monomethylsilazane of the unit structure

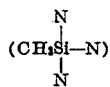

and heated at 115° C. for 13 hours. A clear rubbery material was obtained which contained both siloxane and silazane linkages.

Example 7

50 g. of a siloxane resin containing 28 mol per cent dimethylsiloxane, 34 mol per cent monomethylsiloxane and 38 mol per cent monophenylsiloxane and containing 3.5 per cent by weight silicon bonded hydroxyl groups, was mixed with 9.46 g. of hexamethylcyclotrisilazane and coated on a glass plate. After 15 minutes at room temperature, the resin had set. After heating 1 hour at 60° C., the film had a pencil hardness of between B and 3B. Another sample was dipped and heated 1 hour at 140° C., at the end of that time the pencil hardness was 2H. By contrast, a sample of the siloxane resin having the composition shown above but containing zinc naphthanate as a catalyst, gave a pencil hardness of only 5B when applied to glass and heated 1 hour at 60° C. The same resin had a hardness of only 3B when heated 1 hour at 140° C. on glass. These tests show the greater rapidity of hardening obtained by the method of this invention. Furthermore, the films obtained by the silazane polymerization were not only harder but tougher and more flexible than those obtained by the conventional method.

Example 8

When 2 g. of [(CH₃)₂SiNCH₃]₃ is reacted with 10 g. of the hydroxylated fluid of Example 5 and the mixture is heated at 60° C. for 2 hours, a viscous polymeric material is obtained.

Example 9

When 100 g. of a hydroxylated siloxane copolymer containing 2 per cent silicon bonded OH groups and having the composition 15 mol per cent vinylsiloxane, 25 mol per cent dibutylsiloxane, 15 mol per cent cyclohexylsiloxane, 15 mol per cent xenylsiloxane and 30 mol per cent tolylmethylsiloxane is mixed with 25 g. of mixed silazanes of the formula

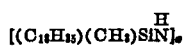

where $x$ is above 3, a resinous copolymer containing both siloxane and silazane linkages is obtained.

That which is claimed is:

1. A method of polymerizing a hydroxylated organosilicon compound containing at least .6 per cent by weight silicon bonded hydroxyl groups and from .9 to 3 monovalent hydrocarbon radicals free of C≡C linkages per silicon atom, in said organosilicon compound any remaining valences of the silicon being satisfied by oxygen atoms, which method comprises reacting said organosilicon compound with an organosilazane of the formula

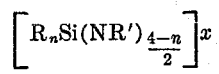

where R is a monovalent hydrocarbon free of C≡C linkages, $n$ has a value of from 1.99 to 2, R' is selected from the group consisting of hydrogen atoms and methyl radicals and $x$ is an integer of at least 3, said silazane being present in amount of at least .1 per cent by weight based on the weight of the hydroxylated organosilicon compound.

2. A method of polymerizing a hydroxylated organosilicon compound containing at least .6 per cent by weight silicon bonded hydroxyl groups and from .9 to 3 hydrocarbon radicals selected from the group consisting of phenyl and methyl radicals, per silicon atom, in said organosilicon compound any remaining valences of the silicon being satisfied by oxygen atoms, which method comprises reacting said organosilicon compound with an organosilazane of the formula

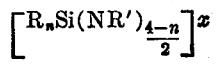

where R is of the group consisting of phenyl and methyl radicals, $n$ has an average value from 1.99 to 2, R' is of the group consisting of hydrogen atoms and methyl radicals and $x$ is an integer of at least 3, said silazane being present in amount of at least .1 per cent by weight based on the weight of the hydroxylated organosilicon compound.

References Cited in the file of this patent

UNITED STATES PATENTS

| Number | Name | Date |
|--------|------|------|
| 2,503,919 | Patnode | Apr. 11, 1950 |